(12) United States Patent
Liu et al.

(10) Patent No.: US 12,120,694 B2
(45) Date of Patent: Oct. 15, 2024

(54) ALLOCATION OF RESOURCES TO A TERMINAL DEVICE

(71) Applicant: Telefonaktiebolaget LM Ericsson (PUBL), Stockholm (SE)

(72) Inventors: Jinhua Liu, Beijing (CN); Min Wang, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 626 days.

(21) Appl. No.: 17/289,819

(22) PCT Filed: Oct. 11, 2019

(86) PCT No.: PCT/SE2019/050997
§ 371 (c)(1),
(2) Date: Apr. 29, 2021

(87) PCT Pub. No.: WO2020/091644
PCT Pub. Date: May 7, 2020

(65) Prior Publication Data
US 2021/0400710 A1    Dec. 23, 2021

(30) Foreign Application Priority Data
Oct. 29, 2018    (WO) ............... PCT/CN2018/112464

(51) Int. Cl.
*H04W 72/23*    (2023.01)
(52) U.S. Cl.
CPC ............................ *H04W 72/23* (2023.01)

(58) Field of Classification Search
None
See application file for complete search history.

(56) References Cited

U.S. PATENT DOCUMENTS

| | | | |
|---|---|---|---|
| 11,923,939 B2* | 3/2024 | Chen | H04B 7/0639 |
| 2019/0053211 A1* | 2/2019 | Ying | H04W 72/044 |
| 2019/0166519 A1* | 5/2019 | Kunt | H04W 72/1268 |
| 2019/0253197 A1* | 8/2019 | Babaei | H04L 1/188 |
| 2019/0253531 A1* | 8/2019 | Basu Mallick | H04W 28/20 |
| 2021/0068114 A1* | 3/2021 | Xu | H04W 72/53 |
| 2022/0007385 A1* | 1/2022 | Dudda | H04L 1/08 |
| 2022/0116152 A1* | 4/2022 | Iyer | H04L 1/188 |
| 2023/0232422 A1* | 7/2023 | Lee | H04W 72/1263 370/329 |
| 2023/0247638 A1* | 8/2023 | Ouchi | H04W 72/1268 370/329 |

OTHER PUBLICATIONS

3GPP TSG-RAN WG2 #99bis; Prague, CZ; Source: CATT; Title: Further consideration on the transmission profile parameters (R2-1710299, Update of R2-1707916)—Oct. 9-13, 2017.

(Continued)

*Primary Examiner* — Otis L Thompson, Jr.
(74) *Attorney, Agent, or Firm* — Sage Patent Group

(57) ABSTRACT

There is provided mechanisms for allocating resources to a terminal device. The method is performed by a network node. A method comprises transmitting a control message towards the wireless device for allocating the resources to the terminal device. The control message indicates that a new dynamic grant or assignment overrides an existing dynamic grant or assignment for the terminal device.

13 Claims, 7 Drawing Sheets

(56) References Cited

OTHER PUBLICATIONS

3GPP TSG-RAN WG2 #103bis; Chengu, China; Source: CATT; Title: Msg3 grant overlapping with another UL grant (R2-1813851)—Oct. 8-12, 2018.
3GPP TSG-RAN WG2 #103bis; Chengdu, China; Source: Ericsson; Title: Intra-UE prioritization (Tdoc R2-1814812)—Oct. 8-12, 2018.
3GPP TSG-RAN WG2 Meeting #103bis; Chengdu, China; Source: Nokia, Nokia Shanghai Bell; Title: Scenarios for intra-UE prioritization/multiplexing (R2-1814995)—Oct. 8-12, 2018.
PCT International Search Report issued for International application No. PCT/SE2019/050997—Jan. 2, 2020.
PCT Written Opinion of the International Searching Authority issued for International application No. PCT/SE2019/050997—Jan. 2, 2020.

* cited by examiner

ALLOCATION OF RESOURCES TO A TERMINAL DEVICE

PRIORITY

This nonprovisional application is a U.S. National Stage Filing under 35 U.S.C. § 371 of International Patent Application Serial No. PCT/SE2019/050997 filed Oct. 11, 2019 and entitled "ALLOCATION OF RESOURCES TO A TERMINAL DEVICE" which claims priority to International Patent Application Serial No. PCT/CN2018/112464 filed Oct. 29, 2018 both of which are hereby incorporated by reference in their entirety.

TECHNICAL FIELD

Embodiments presented herein relate to a method, a network node, a computer program, and a computer program product for allocating resources to a terminal device. Embodiments presented herein further relate to a method, a terminal device, a computer program, and a computer program product for receiving allocation of resources from a network node.

BACKGROUND

In communications networks, there may be a challenge to obtain good performance and capacity for a given communications protocol, its parameters and the physical environment in which the communications network is deployed.

For example, it has been agreed that in the fifth generation (5G) telecommunication system denoted New Radio (NR), one common network should be able to serve multiple services of deviated Quality of Service (QoS) requirements and procedures for hybrid automatic repeat request (hybrid ARQ or HARQ) configuration should be able to fulfil different delay requirements. It has further been agreed that in the 5G telecommunication system denoted NR, one common scheduling signaling mechanism, which is applicable for both time division duplexing (TDD) and frequency division duplexing FDD, should be used. Further, the common scheduling mechanism should also be applicable for served terminal devices of different signal processing delay capability (for example in terms of PUSCH preparation delay and PDSCH reception delay, where PUSCH is short for physical uplink shared channel, and PDSCH is short for physical downlink shared channel and represent the uplink and downlink data channels, respectively).

According to the scheduling mechanism, the scheduling signaling design in the 5G telecommunication system denoted NR provides sufficient flexibility so that the serving network node can configure different delay parameters balance multiple factors, such as delay requirements of different services, terminal device capabilities, duplexing mode (TDD/FDD), and spectrum efficiency. Three related delay parameters are denoted K0, K1, and K2 and will be described with reference to FIG. 1. FIG. 1 at 10 gives a schematic illustration of resource allocation for a terminal device as a function of time.

Delay parameter K0 represents the time delay between initial transmission of the downlink assignment from the network node (as provided to the terminal device from the network node on PDCCH, where PDCCH is short for physical downlink control channel) and the start of the corresponding downlink data reception by the terminal device on PDSCH.

Delay parameter K1 represents the time delay between downlink data reception (on PDSCH) for the terminal device and corresponding acknowledgement transmission (in FIG. 1 represented by NACK, indicating a negative acknowledgment of the PDSCH, i.e., that the terminal device did not receive, or was able to correctly decode, the PDSCH) on the uplink of the downlink data by the terminal device. In the example of FIG. 1, the data is retransmitted (PDSCH ReTx) immediately after a new PDCCH transmission-Delay parameter K2 represents the time delay between reception of the uplink grant on PDCCH and transmission of uplink data on PUSCH.

How to apply K0 at the terminal device side for PDSCH reception is described in Section 5.1.2.1 of 3GPP TS 58.213-V15.3.0. Either a default PDSCH time domain allocation A, B or C according to Tables 5.1.2.1.1-2, 5.1.2.1.1-3, 5.1.2.1.1.-4 and 5.1.2.1.1-5 is applied, or the higher layer configured pdsch-TimeDomainAllocationList in either pdsch-ConfigCommon or pdsch-Config is applied.

In more detail, when the terminal device is scheduled to receive PDSCH by a receiving downlink control information (DCI), the Time domain resource assignment field value m of the DCI provides a row index m+1 to an allocation table. The determination of the used resource allocation table is defined in sub-clause 5.1.2.1.1 of 3GPP TS 58.213-V15.3.0. The indexed row defines the slot offset K0, the start and length indicator SLIV, or directly the start symbol S and the allocation length L, and the PDSCH mapping type to be assumed in the PDSCH reception.

Delay parameter K1 can also be indicated in DCI for PDSCH scheduling. In 3GPP TS 38.331-V15.3.0. A field in PUCCH-Config IE has been defined to configure the candidate values for K1.

In Section 6.1.2.1 of 3GPP TS 38.213-V15.3.0, the procedures on applying K2 for uplink scheduling is specified. Either a default PUSCH time domain allocation A according to table 6.1.2.1.1-2 in 3GPP TS 38.213-V15.3.0 is applied, or the higher layer configured pusch-TimeDomainAllocationList in either pusch-ConfigCommon or pusch-Config is applied.

According to the current scheduling procedure as described in 3GPP TS 38.214-V15.3.0, a terminal device may be scheduled with a future PDSCH reception or a future PUSCH transmission for enhance mobile broadband (eMBB) traffic (or any other traffic, such as video) by indicating (a value of) delay parameter K0 in a downlink assignment or (a value of) delay parameter K2 in a dynamic uplink grant. However afterwards, upon reception of a scheduling request (SR) or buffer status report (BSR) which indicates a critical uplink transmission request (e.g. a need for transmission of a ultra reliable low latency communication (URLLC) packet in the uplink) or a URLLC packet arrives at the serving network node for the same terminal device, the serving network node may need resource immediately to be used for this URLLC packet. But the desired resource may have already been allocated for uplink or downlink transmission. In the current medium access control (MAC) specification as provided in 3GPP TS 38.321-V15.3.0, the behavior of the terminal device to override a configured uplink grant with a dynamic uplink grant and to override a configured downlink assignment with a dynamic downlink assignment has been defined.

However, there is still a need for an improved scheduling of available transmission resources and reception resources for terminal devices served by a network node in a communication network.

SUMMARY

An object of embodiments herein is to provide efficient handling of dynamic grants and assignments that does not suffer from the issues noted above, or at least where the above issues are mitigated or reduced.

According to a first aspect there is presented a method for allocating resources to a terminal device. The method is performed by a network node. The method comprises transmitting a control message towards the wireless device for allocating the resources to the terminal device. The control message indicates that a new dynamic grant overrides an existing assignment or that a new assignment overrides an existing dynamic grant for the terminal device.

According to a second aspect there is presented a network node for allocating resources to a terminal device. The network node comprises processing circuitry. The processing circuitry is configured to cause the network node to transmit a control message towards the wireless device for allocating the resources to the terminal device. The control message indicates that a new dynamic grant overrides an existing assignment or that a new assignment overrides an existing dynamic grant for the terminal device.

According to a third aspect there is presented a computer program for allocating resources to a terminal device. The computer program comprises computer program code which, when run on processing circuitry of a network node, causes the network node to perform a method according to the first aspect.

According to a fourth aspect there is presented a method for receiving allocation of resources from a network node. The method is performed by a terminal device. The method comprises receiving a control message from a network node for allocation of the resources to the terminal device. The control message indicates that a new dynamic grant overrides an existing assignment or that a new assignment overrides an existing dynamic grant for the terminal device. The method comprises, in response thereto, discarding the existing dynamic grant or assignment in order to perform transmission or reception according to the new dynamic grant or assignment.

According to a fifth aspect there is presented a terminal device for receiving allocation of resources from a network node. The terminal device comprises processing circuitry. The processing circuitry is configured to cause the terminal device to receive a control message from a network node for allocation of the resources to the terminal device. The control message indicates that a new dynamic grant overrides an existing dynamic grant or that a new assignment overrides an existing dynamic grant for the terminal device. The processing circuitry is configured to cause the terminal device to, in response thereto, discard the existing dynamic grant or assignment in order to perform transmission or reception according to the new dynamic grant or assignment.

According to a sixth aspect there is presented a computer program for receiving allocation of resources from a network node, the computer program comprising computer program code which, when run on processing circuitry of a terminal device, causes the terminal device to perform a method according to the fourth aspect.

According to a ninth aspect there is presented a computer program product comprising a computer program according to at least one of the third aspect and the sixth aspect and a computer readable storage medium on which the computer program is stored. The computer readable storage medium could be a non-transitory computer readable storage medium.

Advantageously these methods, this network node, this terminal device, these computer programs, and this computer program product provide efficient handling of dynamic grants and assignments.

Advantageously these methods, this network node, this terminal device, these computer programs, and this computer program product enable improved scheduling of available transmission resources and reception resources for terminal devices served by the network node.

Advantageously these methods, this network node, this terminal device, these computer programs, and this computer program product enable the network node to ensure that delay requirements for delay critical service, for example when terminal device has mixed services, to be kept regardless of type of service.

Advantageously these methods, this network node, this terminal device, these computer programs, and this computer program product enables the spectrum efficiency to be enhanced because the network node does not need to reserve dedicated resource for high priority services beforehand, but is instead enabled to replace an existing dynamic grant or assignment with a new dynamic grant or assignment.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
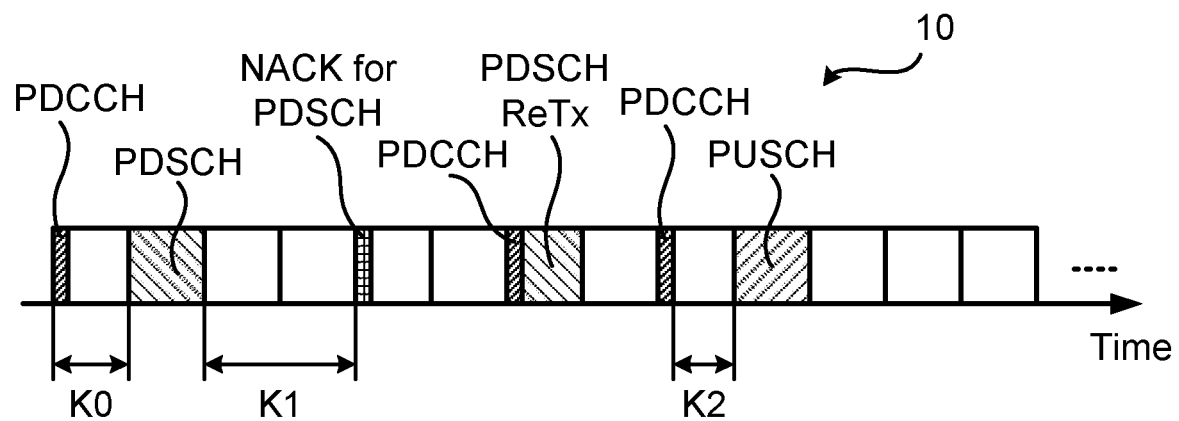
FIG. 1 is a schematic illustration of resource allocation for a terminal device as a function of time.
Figure 2:
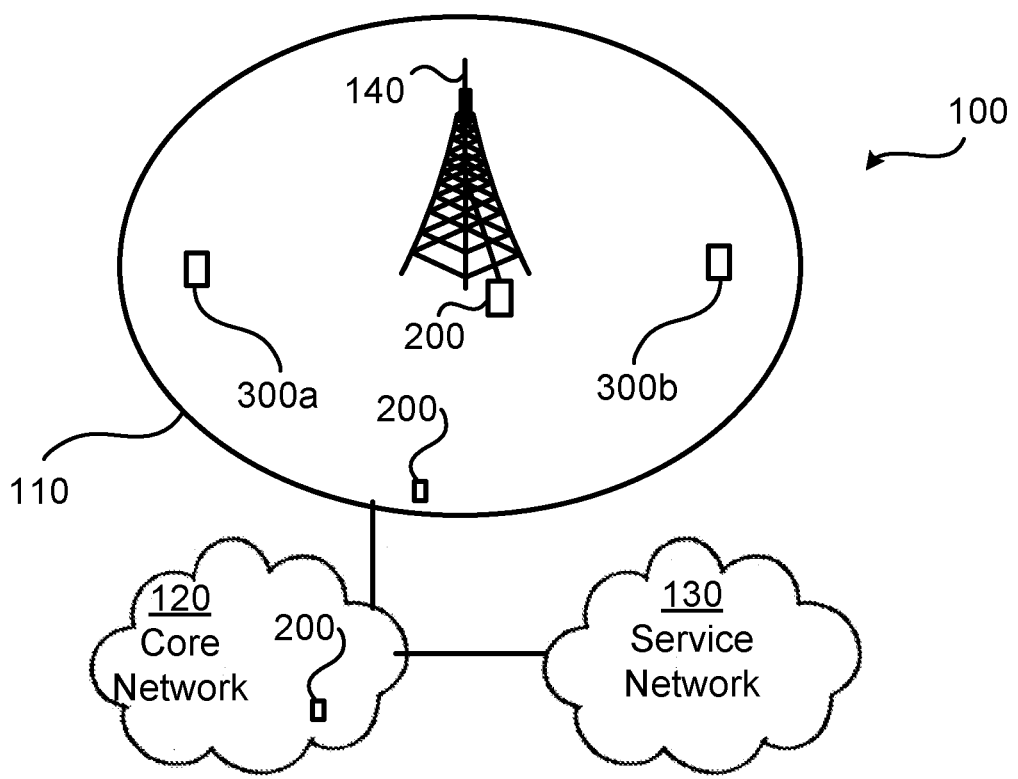
FIG. 2 is a schematic diagram illustrating a communication network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a network node 200 configured to, via a transmission and reception point 140, provide network access to terminal devices 300a, 300b in a radio access network 110, thus enabling the terminal devices 300a, 300b to communicate over respective wireless links with the transmission and reception point 140. The radio access network 110 is operatively connected to a core network 120. The core network 120 is in turn operatively connected to a service network 130, such as the Internet. The terminal devices 300a, 300b are thereby enabled to, via the network node 200, access services of, and exchange data with, the service network 130. In some aspects the network node 200 serves the terminal devices 300a, 300b over a 5G NR air interface, although also other air interfaces are possible.

Examples of network nodes 200 are radio access network nodes, radio base stations, base transceiver stations, Node Bs, evolved Node Bs, g Node Bs, access points, and access nodes, and backhaul nodes. Examples of terminal devices 300a, 300b are wireless devices, mobile stations, mobile phones, handsets, wireless local loop phones, user equipment (UE), smartphones, laptop computers, tablet computers, network equipped sensors, network equipped vehicles (such as cars, ships, helicopters, aeroplanes, unmanned aerial vehicles, etc.), and so-called Internet of Things (IoT) devices.

As disclosed above there is still a need for improved scheduling of available transmission resources and reception resources for terminal devices 300a, 300b served by a network node 200 in a communication network 100.

In the 5G telecommunication system denoted NR, a serving network node 200 can configure the time for uplink transmission or downlink reception for each terminal device 300a, 300b by using the delay parameters K0 and K1 in the DCI. Sometimes the network node 200 needs to change issued grants (or assignments) between dynamic grants or assignments). The herein disclosed embodiments allow the network node 200 to override a previously issued dynamic grant/assignment with a new dynamic grant/assignment when necessary. The herein disclosed embodiments further allow the terminal devices 300a, 300b to discard a previously issued dynamic grant/assignment when receiving a new dynamic grant/assignment.

The embodiments disclosed herein therefore relate to mechanisms for allocating resources to a terminal device 300a and receiving allocation of resources from a network node 200. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a terminal device 300a, a method performed by the terminal device 300a, and a computer program product comprising code, for example in the form of a computer program, that when run on processing circuitry of the terminal device 300a, causes the terminal device 300a to perform the method.

Figure 3:
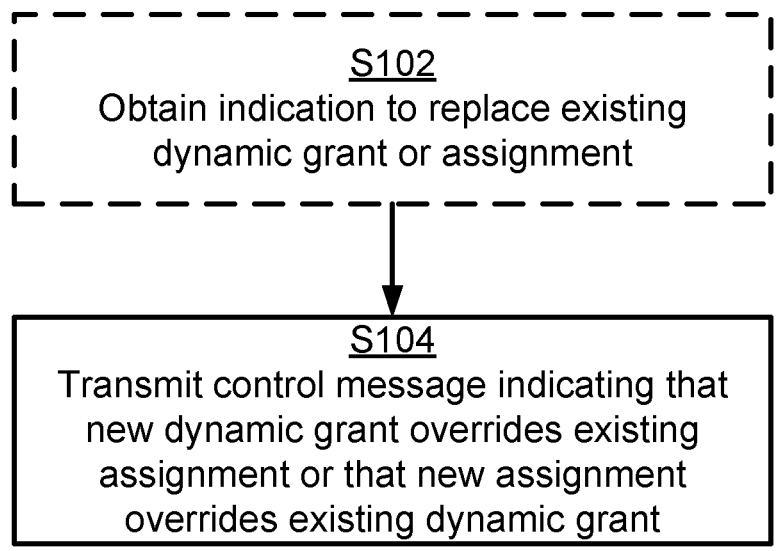
FIGS. 3 and 4 are flowcharts of methods according to embodiments.

Reference is now made to FIG. 3 illustrating a method for allocating resources to a terminal device 300a as performed by the network node 200 according to an embodiment.

According to the herein disclosed embodiments a new dynamic grant or assignment is allowed to override an existing dynamic grant or assignment when needed. The network node 200 is therefore configured to perform step S104:

S104: The network node 200 transmits a control message towards the wireless device 300a for allocating the resources to the terminal device 300a. The control message indicates that a new dynamic grant overrides an existing assignment or that a new assignment overrides an existing dynamic grant for the terminal device 300a.

In this respect, the resources thus correspond to resources in a time/frequency grid according to which data is transmitted or received by the terminal device 300a. The resources could be a block of resources. Examples of such resources are physical resource blocks (PRBs).

Embodiments relating to further details of allocating resources to a terminal device 300a as performed by the network node 200 will now be disclosed.

There could be different ways in which the new dynamic grant overrides the existing assignment or the new assignment overrides the existing dynamic grant for the terminal device 300a.

As mentioned above, the new dynamic grant or assignment is respectively allowed to override the existing assignment and dynamic grant when needed. There could be different needs. In some aspects the need is defined by an indication obtained by the network node 200 to replace the existing dynamic grant or assignment. Particularly, according to an embodiment the network node 200 is configured to perform (optional) step S102:

S102: The network node 200 obtains an indication to replace the existing dynamic grant or assignment with respectively the new assignment or the new dynamic grant. The control message is then in step S104 transmitted in response to the network node 200 having received the indication in step S102.

There could be different types of such indications, depending on the type of need. Particularly, according to an embodiment the indication is obtained from the terminal device 300a itself, or obtained from a first entity requesting data to be sent to the terminal device 300a, or obtained from a second entity requesting data to be sent to another terminal device 300b. In this respect, the need might be obtained from the terminal device 300a itself when the terminal device 300a has urgent data to transmit or awaits urgent data to be received. For example, the terminal device 300a could have a need for transmission of a URLLC packet in the uplink. The need might be obtained from the first entity when a URLLC packet destined to the terminal device 300a arrives at the network node 200. The need might be obtained from the second entity when a URLLC packet destined to another terminal device 300b arrives at the network node 200. The first entity and the second entity could be respective schedulers. Thus the first entity could be a first scheduler and the second entity could be a second scheduler. In some aspects the first entity and the second entity are one and the same entity.

Figure 4:
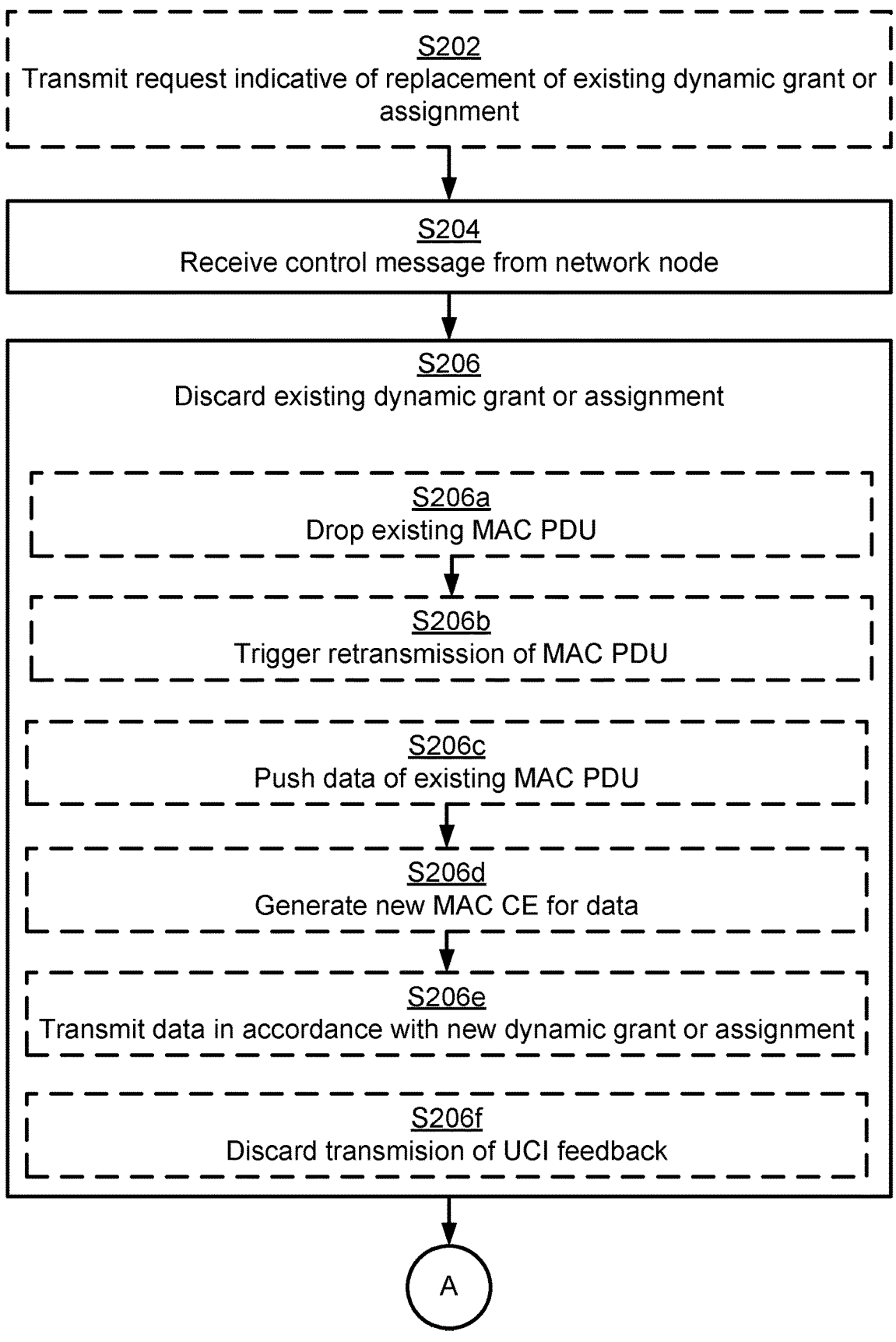
Figure 4:
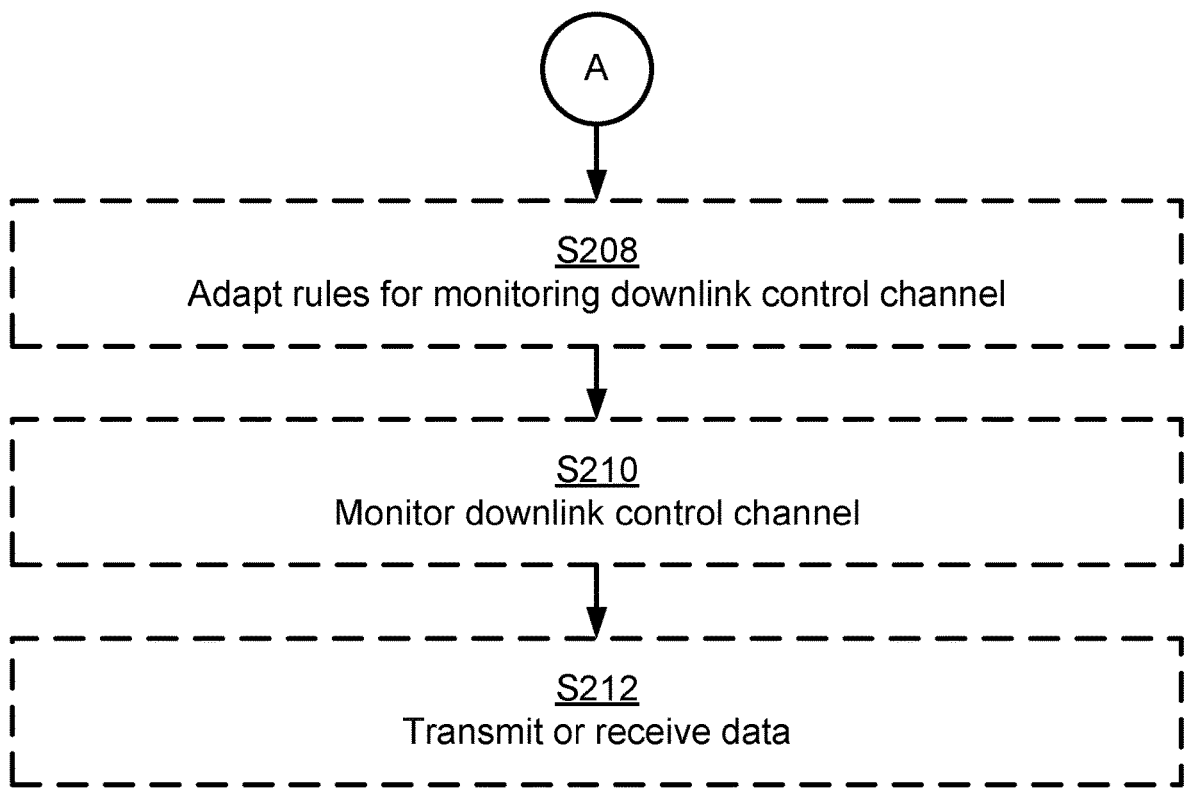

Reference is now made to FIG. 4 illustrating a method for receiving allocation of resources from a network node 200 as performed by the terminal device 300a according to an embodiment.

As disclosed above, the network node in step S104 transmits a control message towards the wireless device 300a. It is assumed that the terminal device 300a receives this control message. Thus, the terminal device 300a is configured to perform step S204:

S204: The terminal device 300a receives a control message from the network node 200 for allocation of the resources to the terminal device 300a. The control message indicates that a new dynamic grant or assignment respectively overrides an existing assignment or a dynamic grant for the terminal device 300a.

The terminal device 300a then discards existing dynamic grant or assignment in order to perform transmission or reception according to the new dynamic assignment/grant. Particularly, the terminal device 300a is configured to perform step S206:

S206: The terminal device 300a discards the existing dynamic grant or assignment in order to perform transmission or reception according to the new assignment or dynamic grant in response thereto (i.e., in response to having received the control message in step S204).

Thereby, when the terminal device 300a receives a new dynamic grant (or assignment) which schedules a PUSCH transmission (or PDSCH reception) that overlaps with another PUSCH transmission (or PDSCH reception) according to an old assignment (or dynamic grant), the terminal device 300a thus discards the old dynamic grant (or assignment) and performs PUSCH transmission (or PDSCH reception) according to the new assignment (dynamic grant).

Embodiments relating to further details of receiving allocation of resources from a network node 200 as performed by the terminal device 300a will now be disclosed.

As disclosed above, there could be different ways in which the new dynamic grant or assignment overrides the existing assignment or dynamic grant for the terminal device 300a and hence different ways in which the terminal device 300a discards the existing dynamic grant or assignment in order to perform transmission or reception according to the new dynamic grant or assignment. Hence according to a first embodiment there is existing dynamic grant, and the new overrides the existing dynamic grant. According to a second embodiment the existing assignment is override by the new dynamic grant.

In case a medium access control (MAC) packet data unit (PDU) has been built for uplink transmission of data, where the uplink transmission corresponds to the existing uplink dynamic grant, the terminal device 300a might use one of the following two options on how to handle the built MAC PDU.

According to a first option the terminal device 300a drops the existing MAC PDU, and informs upper protocol layers (such as Packet Data Convergence Protocol (PDCP) or Radio Link Control (RLC)) to trigger retransmission of the data without waiting for any retransmission timers to be expired. Particularly, according to an embodiment the terminal device 300a is configured to perform (optional) steps S206a, S206b as part of discarding the existing dynamic grant or assignment in step S206:

S206a: The terminal device 300a drops an existing MAC PDU scheduled in accordance with the existing dynamic grant or assignment.

S206b: The terminal device 300a triggers retransmission of the MAC PDU in accordance with the new dynamic grant or assignment, without waiting for any retransmission timer of the MAC PDU to expire.

According to a second option, the terminal device 300a pushes the data contained in the MAC PDU back to queues at the upper protocol layers. Particularly, according to an embodiment the terminal device 300a is configured to perform (optional) step S206c as part of discarding the existing dynamic grant or assignment in step S206:

S206c: The terminal device 300a pushes data of an existing MAC PDU scheduled in accordance with the existing dynamic grant or assignment back in its transmission queue at protocol layer above MAC.

Further, the terminal device 300a can then at MAC level regenerate the MAC control elements (CEs) which are carried in the existing MAC PDU, and carry the newly generated MAC CEs using the new dynamic uplink grant. Particularly, according to an embodiment the terminal device 300a is configured to perform (optional) steps S206d, S206e as part of discarding the existing dynamic grant or assignment in step S206:

S206d: The terminal device 300a generates a new MAC CE for the data.

S206e: The terminal device 300a transmits the data in a new MAC PDU with the MAC CE and in accordance with the new dynamic grant or assignment.

In some aspects, when an existing dynamic grant or assignment is overridden by a new dynamic grant or assignment, the terminal device 300 adapts its rules for monitoring a downlink control channel (such as PDCCH) according to the new dynamic grant or assignment. Particularly, according to an embodiment the terminal device 300a is configured to perform (optional) step S208:

S208: The terminal device 300a adapts rules for monitoring a downlink control channel as transmitted by the network node 200 in accordance with the new dynamic grant or assignment.

In some aspects, there are some symbols (such as orthogonal frequency-division multiplexing (OFDM) symbols) which have been originally scheduled for PUSCH transmission (or PDSCH transmission) according to the existing dynamic grant or assignment but left as flexible symbols according to the new dynamic grant or assignment. The terminal device 300a might then monitor the PDCCH if there is a control resource set (CORESET) configured in the resource region of these flexible symbols. Particularly, according to an embodiment at least some symbols scheduled for reception or transmission according to the existing dynamic grant or assignment are left as flexible symbols according to the new dynamic grant or assignment. The terminal device 300a might then be configured to perform (optional) step S210:

S210: The terminal device 300a monitors a downlink control channel as transmitted by the network node 200 for a CORESET configured in a resource region of the flexible symbols.

In some aspects, for a terminal device 300a whose duplexing capability does not support simultaneous transmissions/receptions with different link directions on adjacent carriers or frequency bands, in case a new dynamic grant or assignment is received on a first cell, carrier, or frequency band which is overlapping in time with an existing dynamic grant or assignment on a second cell, carrier, or frequency band, the existing dynamic grant or assignment and the new dynamic grant or assignment are not allowed to coexist simultaneously according to duplexing capability of the terminal device 300a. In this case, the new dynamic grant or assignment overrides the existing dynamic grant or assignments grants in these cells, adjacent carriers, or frequency bands. Particularly, according to an embodiment the existing dynamic grant or assignment is for a first cell, carrier, or frequency band, and the new dynamic grant or assignment is for a second cell, carrier, or frequency band.

In some aspects, when grant or assignment preemption is applied, the terminal device 300a might be configured to still transmit PUSCH (or receive PDSCH) according to the existing dynamic grant or assignment with any non-preempted radio resource by the new dynamic grant or assignment. Particularly, according to an embodiment the new dynamic grant at least partly overlaps in time with the existing assignment or the new assignment at least partly overlaps in time with the existing dynamic grant. There could thus be a resource allocated according to, but not utilized by, the new dynamic grant or assignment. Such a resource could then still be utilized according to the existing dynamic grant or assignment. Particularly, according to an embodiment the terminal device 300a is configured to perform (optional) step S212:

S212: The terminal device 300a transmits or receives data using this resource according to the existing dynamic grant or assignment.

Thereby, if grant or assignment preemption is applied, the terminal device 300a can still transmit PUSCH (or receive PDSCH) according to the existing grant (or assignment) with the non-preempted resource by the new grant (or assignment).

In some aspects, if an existing dynamic assignment is overridden by a new dynamic grant, the corresponding PUCCH for uplink control information (UCI) feedback scheduled by the existing dynamic assignment is also discarded. Particularly, according to an embodiment the terminal device 300a is configured to perform (optional) step S206f as part of discarding the existing dynamic grant or assignment in step S206:

S206f: The terminal device 300a discards transmission of UCI feedback towards the network node 200 as scheduled according to the existing dynamic grant or assignment.

As disclosed above, there could be different needs for the new dynamic grant or assignment. As further disclosed above, the need could come from the terminal device 300a itself, for example when the terminal device 300a has urgent data to transmit or awaits urgent data to be received. For example, the terminal device 300a could have a need for transmission of a URLLC packet in the uplink. Particularly, according to an embodiment the terminal device 300a is configured to perform (optional) step S202:

S202: The terminal device 300a transmits a request towards the network node 200. The request is indicative of a need to replace the existing dynamic grant or assignment.

Although some of the embodiments have been described in the context of the 5G telecommunication system denoted NR, the embodiments are also applicable at least to evolvements of Long Term Evolution (LTE) based telecommunication systems where the delay of a grant or assignment is configurable.

Figure 5:
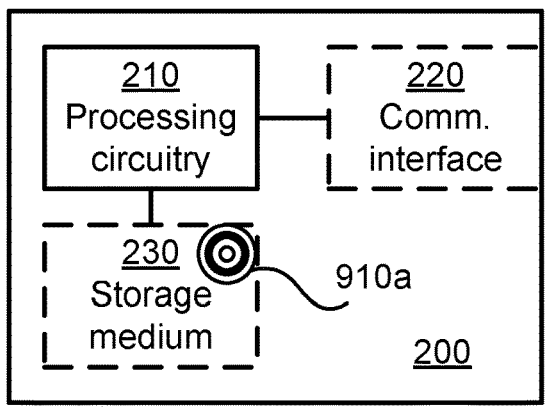
FIG. 5 is a schematic diagram showing functional units of a network node according to an embodiment.

FIG. 5 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices in the communication network 100. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 6:
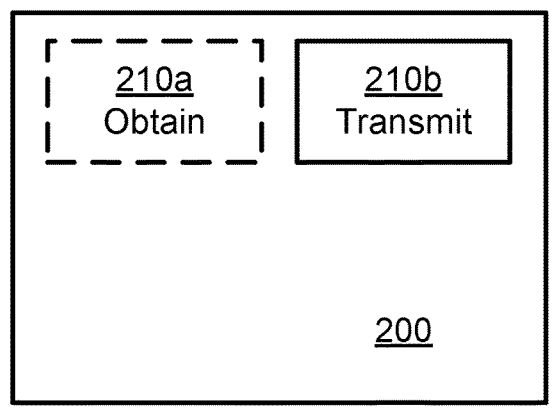
FIG. 6 is a schematic diagram showing functional modules of a network node according to an embodiment.

FIG. 6 schematically illustrates, in terms of a number of functional modules, the components of a network node 200 according to an embodiment. The network node 200 of FIG. 6 comprises a transmit module 210b configured to perform step S104. The network node 200 of FIG. 6 may further comprise a number of optional functional modules, such as an obtain module 210a configured to perform step S102. In general terms, each functional module 210a-210b may be implemented in hardware or in software. Preferably, one or more or all functional modules 210a-210b may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210b and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 5 the processing circuitry 210 may be distributed among a plurality of devices, or nodes. The same applies to the functional modules 210a-210b of FIG. 6 and the computer program 920a of FIG. 9. Some examples of network nodes 200 in which the herein disclosed functionality might be implemented have been provided in conjunction with the description of FIG. 2.

Figure 7:
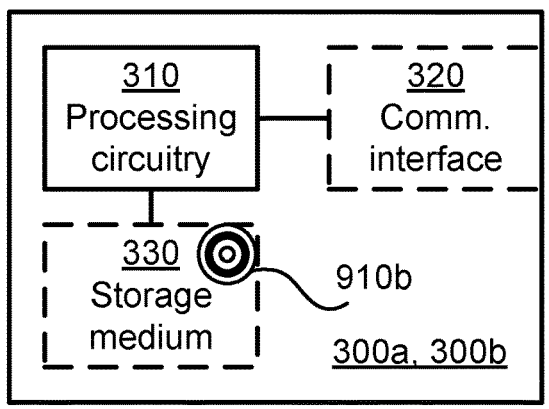
FIG. 7 is a schematic diagram showing functional units of a terminal device according to an embodiment.

FIG. 7 schematically illustrates, in terms of a number of functional units, the components of a terminal device 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the terminal device 300a, 300b to perform a set of operations, or steps, as disclosed above. For example, the storage medium 330 may store the set of operations, and the processing circuitry 310 may be configured to retrieve the set of operations from the storage medium 330 to cause the terminal device 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The terminal device 300a, 300b may further comprise a communications interface 320 for communications with entities, functions, nodes, and devices in the communication network 100. As such the communications interface 320 may comprise one or more transmitters and receivers, comprising analogue and digital components.

The processing circuitry 310 controls the general operation of the terminal device 300a, 300b e.g. by sending data and control signals to the communications interface 320 and the storage medium 330, by receiving data and reports from the communications interface 320, and by retrieving data and instructions from the storage medium 330. Other components, as well as the related functionality, of the terminal device 300a, 300b are omitted in order not to obscure the concepts presented herein.

Figure 8:
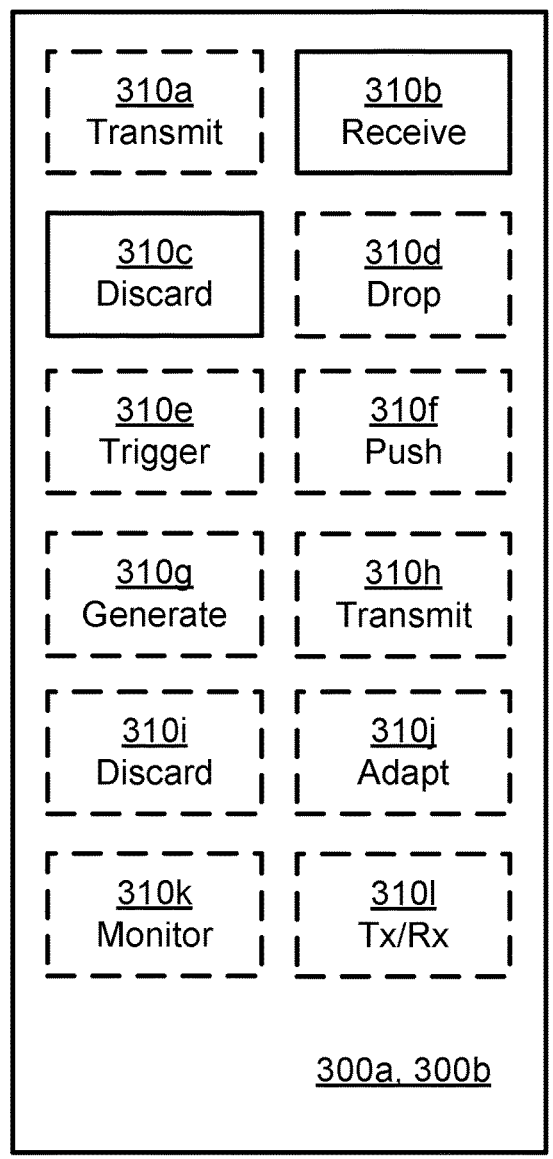
FIG. 8 is a schematic diagram showing functional modules of a terminal device according to an embodiment.

FIG. 8 schematically illustrates, in terms of a number of functional modules, the components of a terminal device 300a, 300b according to an embodiment. The terminal device 300a, 300b of FIG. 8 comprises a number of functional modules; a receive module 310b configured to perform step S204, and a discard module 310c configured to perform step S206. The terminal device 300a, 300b of FIG. 8 may further comprise a number of optional functional modules, such as any of a transmit module 310a configured to perform step S202, a drop module 310d configured to perform step S206a, a trigger module 310e configured to perform step S206b, a push module 310f configured to perform step S206c, a generate module 310g configured to perform step S206d, a transmit module 310h configured to perform step S206e, a discard module 310i configured to perform step S206f, an adapt module 310j configured to perform step S208, a monitor module 310j configured to perform step S210, a transmit/receive (Tx/Rx) module 310k configured to perform step S212.

In general terms, each functional module 310a-310l may be implemented in hardware or in software. Preferably, one or more or all functional modules 310a-310l may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310l and to execute these instructions, thereby performing any steps of the terminal device 300a, 300b as disclosed herein. Some examples of terminal devices 300a, 300b in which the herein disclosed functionality might be implemented have been provided in conjunction with the description of FIG. 2.

Figure 9:
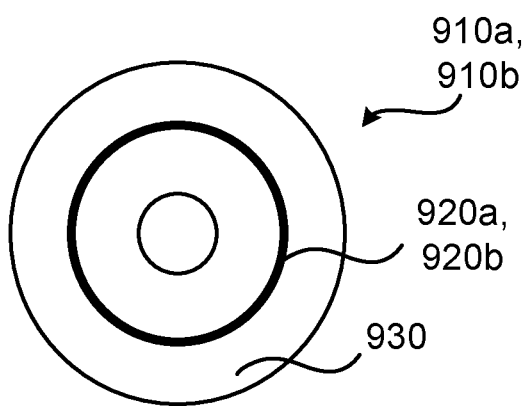
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the network node 200 as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the terminal device 300a, 300b as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

Figure 10:
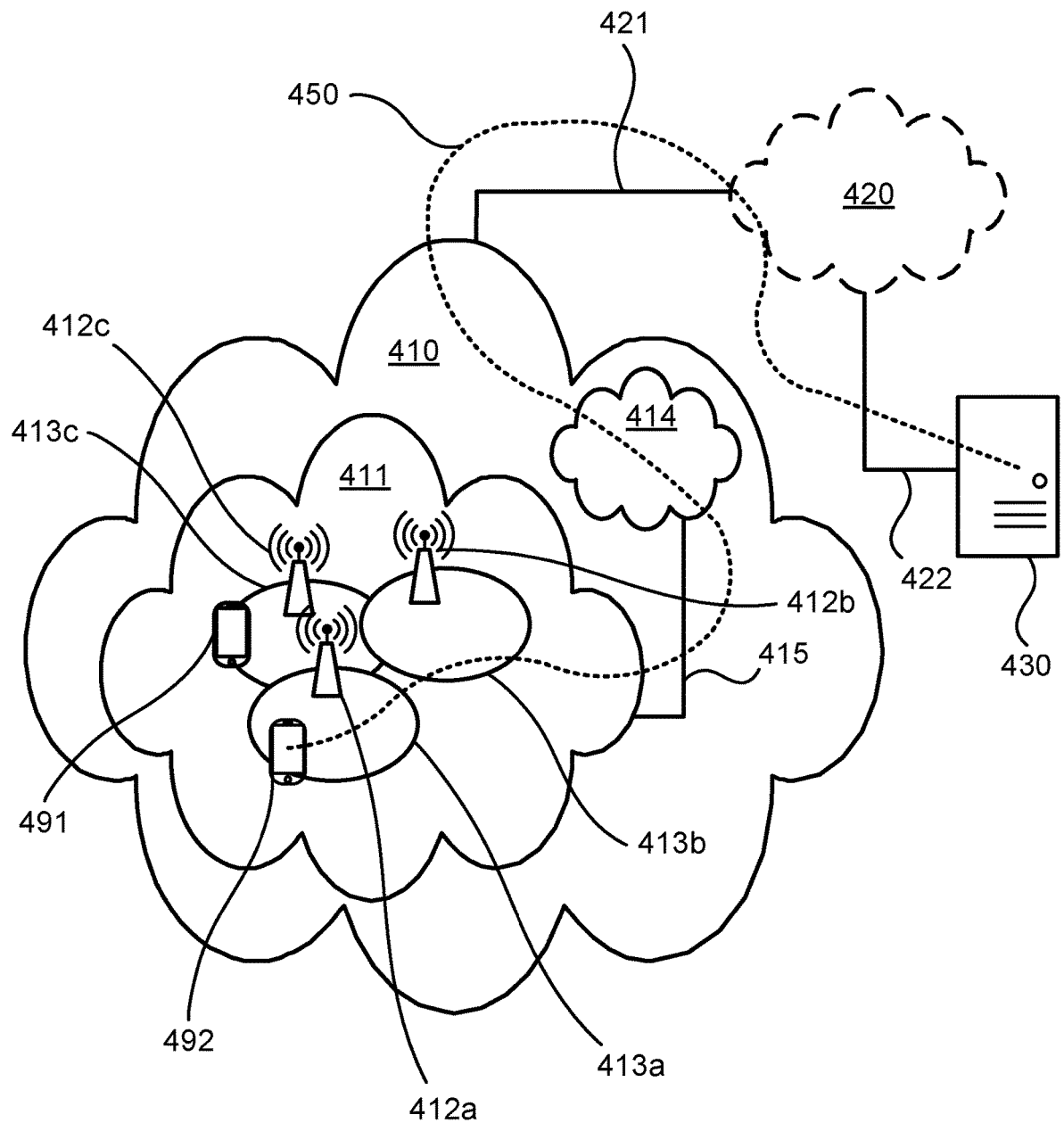
FIG. 10 is a schematic diagram illustrating a telecommunication network connected via an intermediate network to a host computer in accordance with some embodiments.

FIG. 10 is a schematic diagram illustrating a telecommunication network connected via an intermediate network to a host computer in accordance with some embodiments. In accordance with an embodiment, a communication system includes telecommunication network 410, such as a 3GPP-type cellular network, which comprises access network 411, such as radio access network 110 in FIG. 2, and core network 414, such as core network 120 in FIG. 2. Access network 411 comprises a plurality of network nodes 412a, 412b, 412c, such as NBs, eNBs, gNBs (each corresponding towards the network node 200 of FIG. 2) or other types of wireless access points, each defining a corresponding coverage area, or cell, 413a, 413b, 413c. Each network node 412a, 412b, 412c is connectable to core network 414 over a wired or wireless connection 415. A first terminal device 491 located in coverage area 413c is configured to wirelessly connect to, or be paged by, the corresponding network node 412c. A second terminal device 492 in coverage area 413a is wirelessly connectable to the corresponding network node 412a. While a plurality of terminal devices 491, 492 are illustrated in this example, the disclosed embodiments are equally applicable to a situation where a sole terminal device is in the coverage area or where a sole terminal device is connecting to the corresponding network node 412. The terminal devices 491, 492 correspond to the terminal devices 300a, 300b of FIGS. 2, 7, 8.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected terminal devices 491, 492 and host computer 430. The connectivity may be described as an over-the-top (OTT) connection 450. Host computer 430 and the connected terminal devices 491, 492 are configured to communicate data and/or signalling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, network node 412 may not or need not be informed about the past routing of an incoming downlink communication with data originating from host computer 430 to be forwarded (e.g., handed over) to a connected terminal device 491. Similarly, network node 412 need not be aware of the future routing of an outgoing uplink communication originating from the terminal device 491 towards the host computer 430.

Figure 11:
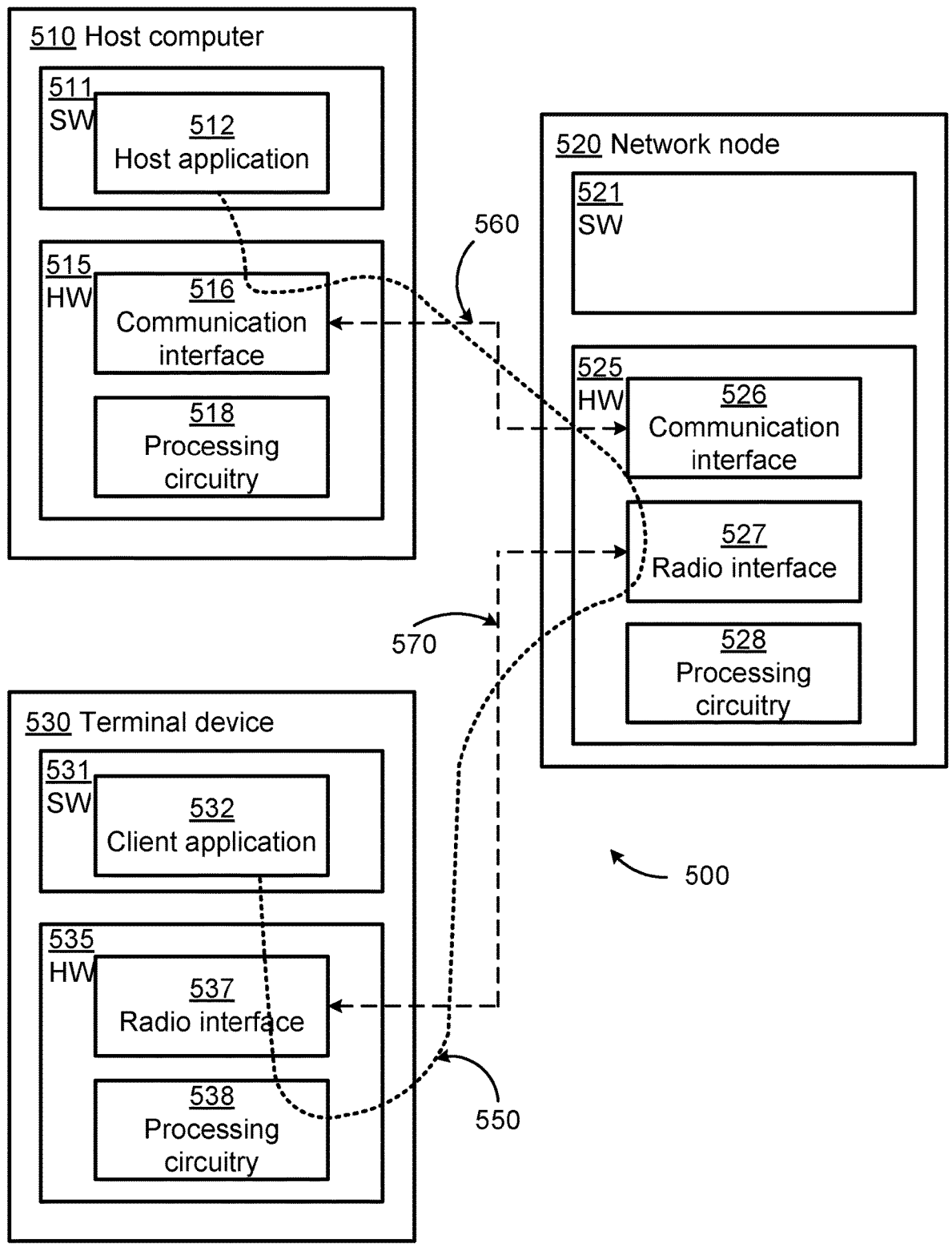
FIG. 11 is a schematic diagram illustrating host computer communicating via a network node with a terminal device over a partially wireless connection in accordance with some embodiments.

FIG. 11 is a schematic diagram illustrating host computer communicating via a network node with a terminal device over a partially wireless connection in accordance with some embodiments. Example implementations, in accordance with an embodiment, of the terminal device, network node and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as terminal device 530 connecting via OTT connection 550 terminating at terminal device 530 and host computer 510. The terminal device 530 corresponds to the terminal devices 300a, 300b of FIGS. 2, 7, 8. In providing the service to the remote user, host application 512 may provide user data which is transmitted using OTT connection 550.

Communication system 500 further includes network node 520 provided in a telecommunication system and comprising hardware 525 enabling it to communicate with host computer 510 and with terminal device 530. The network node 520 corresponds towards the network nodes 200 of FIGS. 2, 5, 6. Hardware 525 may include communication interface 526 for setting up and maintaining a wired or wireless connection with an interface of a different communication device of communication system 500, as well as radio interface 527 for setting up and maintaining at least wireless connection 570 with terminal device 530 located in a coverage area (not shown in FIG. 11) served by network node 520. Communication interface 526 may be configured to facilitate connection 560 to host computer 510. Connection 560 may be direct or it may pass through a core network (not shown in FIG. 11) of the telecommunication system and/or through one or more intermediate networks outside the telecommunication system. In the embodiment shown, hardware 525 of network node 520 further includes processing circuitry 528, which may comprise one or more programmable processors, application-specific integrated circuits, field programmable gate arrays or combinations of these (not shown) adapted to execute instructions. Network node 520 further has software 521 stored internally or accessible via an external connection.

Communication system 500 further includes terminal device 530 already referred to. Its hardware 535 may include radio interface 537 configured to set up and maintain wireless connection 570 with a network node serving a coverage area in which terminal device 530 is currently located. Hardware 535 of terminal device 530 further includes processing circuitry 538, which may comprise one or more programmable processors, application-specific integrated circuits, field programmable gate arrays or combinations of these (not shown) adapted to execute instructions. Terminal device 530 further comprises software 531, which is stored in or accessible by terminal device 530 and executable by processing circuitry 538. Software 531 includes client application 532. Client application 532 may be operable to provide a service to a human or non-human user via terminal device 530, with the support of host computer 510. In host computer 510, an executing host application 512 may communicate with the executing client application 532 via OTT connection 550 terminating at terminal device 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, network node 520 and terminal device 530 illustrated in FIG. 11 may be similar or identical to host computer 430, one of network nodes 412a, 412b, 412c and one of terminal devices 491, 492 of FIG. 10, respectively. This is to say, the inner workings of these entities may be as shown in FIG. 11 and independently, the surrounding network topology may be that of FIG. 10.

In FIG. 11, OTT connection 550 has been drawn abstractly to illustrate the communication between host computer 510 and terminal device 530 via network node 520, without explicit reference to any intermediary devices and the precise routing of messages via these devices. Network infrastructure may determine the routing, which it may be configured to hide from terminal device 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between terminal device 530 and network node 520 is in accordance with the teachings of the embodiments described throughout this disclosure. One or more of the various embodiments improve the performance of OTT services provided to terminal device 530 using OTT connection 550, in which wireless connection 570 forms the last segment. More precisely, the teachings of these embodiments may reduce interference, due to improved classification ability of airborne terminal devices which can generate significant interference.

A measurement procedure may be provided for the purpose of monitoring data rate, latency and other factors on which the one or more embodiments improve. There may further be an optional network functionality for reconfiguring OTT connection 550 between host computer 510 and terminal device 530, n response to variations in the measurement results. The measurement procedure and/or the network functionality for reconfiguring OTT connection 550 may be implemented in software 511 and hardware 515 of host computer 510 or in software 531 and hardware 535 of terminal device 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect network node 520, and it may be unknown or imperceptible to network node 520. Such procedures and functionalities may be known and practiced in the art. In certain embodiments, measurements may involve proprietary terminal device signalling facilitating host computer's 510 measurements of throughput, propagation times, latency and the like. The measurements may be implemented in that software 511 and 531 causes messages to be transmitted, in particular empty or 'dummy' messages, using OTT connection 550 while it monitors propagation times, errors etc.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for receiving allocation of resources from a network node, the method being performed by a terminal device, the method comprising:
   receiving a control message from a network node for allocation of the resources to the terminal device, the control message indicating that a new dynamic grant or assignment overrides an existing dynamic grant or assignment for the terminal device; and in response thereto:
   discarding the existing dynamic grant or assignment in order to perform transmission or reception according to the new dynamic grant or assignment, wherein discarding the existing dynamic grant or assignment comprises discarding transmission of uplink control information (UCI) feedback towards the network node as scheduled according to the existing dynamic grant or assignment, and wherein discarding the existing dynamic grant or assignment comprises:
   pushing data of an existing medium access control (MAC) packet data unit (PDU) scheduled in accordance with the existing dynamic grant or assignment back in its transmission queue at protocol layer above MAC.

2. The method according to claim 1, wherein discarding the existing dynamic grant or assignment comprises:
   dropping an existing medium access control (MAC) packet data unit (PDU) scheduled in accordance with the existing dynamic grant or assignment; and
   triggering retransmission of the MAC PDU in accordance with the new dynamic grant or assignment, without waiting for any retransmission timer of the MAC PDU to expire.

3. The method according to claim 1, wherein discarding the existing dynamic grant or assignment further comprises:
   generating a new MAC control element (CE) for the data; and
   transmitting the data in a new MAC PDU with the MAC CE and in accordance with the new dynamic grant or assignment.

4. The method according to claim 1, further comprising:
   adapting rules for monitoring a downlink control channel as transmitted by the network node in accordance with the new dynamic grant or assignment.

5. The method according to claim 1, wherein at least some symbols scheduled for reception or transmission according to the existing dynamic grant or assignment are left as flexible symbols according to the new dynamic grant or assignment, the method further comprising:
   monitoring a downlink control channel as transmitted by the network node for a control resource set (CORESET) configured in a resource region of the flexible symbols.

6. The method according to claim 1, wherein the existing dynamic grant or assignment is for a first cell, carrier, or frequency band, and wherein the new dynamic grant or assignment is for a second cell, carrier, or frequency band.

7. The method according to claim 1, wherein the new dynamic grant or assignment at least partly overlaps in time with the existing dynamic grant or assignment.

8. The method according to claim 7, wherein there is a resource allocated according to, but not utilized by, the new dynamic grant or assignment, the method further comprising:

transmitting or receiving data using said resource according to the existing dynamic grant or assignment.

9. The method according to claim 1, wherein discarding the existing dynamic grant or assignment comprises:

discarding transmission of uplink control information (UCI) feedback towards the network node as scheduled according to the existing dynamic grant or assignment.

10. The method according to claim 1, further comprising:

transmitting a request towards the network node, the request being indicative of a need to replace the existing dynamic grant or assignment.

11. The method according to claim 1, wherein the network node serves the terminal device over a fifth generation (5G), new radio (NR), air interface.

12. A terminal device for receiving allocation of resources from a network node, the terminal device comprising processing circuitry, the processing circuitry being configured to cause the terminal device to:

receive a control message from a network node for allocation of the resources to the terminal device, the control message indicating that a new dynamic grant overrides an existing assignment, for the terminal device; and in response thereto:

discard the existing dynamic grant or assignment in order to perform transmission or reception according to the new dynamic grant or assignment, wherein discarding the existing assignment comprises discarding transmission of uplink control information (UCI) feedback towards the network node as scheduled according to the existing or assignment, wherein the discarding of the existing dynamic grant or assignment comprises causing the terminal device to push data of an existing medium access control (MAC) packet data unit (PDU) scheduled in accordance with the existing dynamic grant or assignment back in its transmission queue at protocol layer above MAC.

13. The terminal device according to claim 12, wherein processing circuitry configured to cause the terminal device to discard the existing dynamic grant or assignment comprises processing circuitry configured to cause the terminal device to:

drop an existing medium access control (MAC) packet data unit (PDU) scheduled in accordance with the existing dynamic grant or assignment; and trigger retransmission of the MAC PDU in accordance with the new dynamic grant or assignment, without waiting for any retransmission timer of the MAC PDU to expire.

* * * * *